United States Patent
Dymott

(10) Patent No.: US 6,384,966 B1
(45) Date of Patent: May 7, 2002

(54) MULTIPLE PASS OPTICAL AMPLIFIER WITH THERMAL BIREFRINGENCE COMPENSATION

(75) Inventor: Michael John Peter Dymott, Zurich (CH)

(73) Assignee: Time-Bandwidth Products AG, Zurich (CH)

(*) Notice: Subject to any disclaimer, the term of this patent is extended or adjusted under 35 U.S.C. 154(b) by 0 days.

(21) Appl. No.: 09/433,090

(22) Filed: Nov. 3, 1999

(51) Int. Cl.$^7$ ................................................ H01S 3/00

(52) U.S. Cl. ...................................................... 359/347

(58) Field of Search ........................... 350/377; 359/337, 359/341, 346, 347, 487, 495, 337.1, 341.1; 372/99, 105

(56) References Cited

U.S. PATENT DOCUMENTS

| | | | |
|---|---|---|---|
| 4,872,181 A | * 10/1989 | Johnson et al. | 372/106 |
| 4,935,932 A | * 6/1990 | Johnson et al. | 372/33 |
| 4,941,738 A | * 7/1990 | Olsson | 350/377 |
| 5,038,359 A | * 8/1991 | Pepper et al. | 372/99 |
| 5,048,030 A | * 9/1991 | Hiiro | 372/68 |
| 5,089,786 A | * 2/1992 | Tamura | 359/333 |
| 5,164,954 A | * 11/1992 | Su | 372/94 |
| 5,268,787 A | 12/1993 | McIntyre | 359/347 |
| 5,295,016 A | * 3/1994 | Van Deventer | 359/347 |
| 5,303,314 A | * 4/1994 | Duling, III et al. | 385/11 |
| 5,369,662 A | * 11/1994 | Storm | 372/99 |
| 5,504,763 A | * 4/1996 | Bischel et al. | 372/33 |
| 5,572,358 A | * 11/1996 | Gabl et al. | 359/347 |
| 5,615,043 A | * 3/1997 | Plaessmann et al. | 359/346 |
| 5,640,406 A | * 6/1997 | Injeyan et al. | 372/33 |
| 5,822,113 A | * 10/1998 | Delavaux et al. | 359/341 |
| 5,974,060 A | * 10/1999 | Byren et al. | 372/19 |

OTHER PUBLICATIONS

C. A. Denman et al., "Birefringence Compensation Using a Single Nd: YAG Rod", Advanced Solid State Lasers, 1999.*
W. A. Clarkson et al., Simple Method for Compensation of Thermally–Induced Birefringence in High–Power Solid–State Lasers, EuroCLEO, 1998.*
J. Krasinksi et al., "Multipass Amplifiers Using Optical Circulators", IEEE Journal of Quantum Electronics, vol. 26, No. 5, May 1990, pp. 950–958.*

* cited by examiner

Primary Examiner—Thomas H. Tarcza
Assistant Examiner—Deandra M. Hughes
(74) Attorney, Agent, or Firm—Oppedahl & Larson LLP

(57) ABSTRACT

The 4-pass amplifier comprises an optical isolator (7), a polarizing beamsplitter (2), a gain material (3) and a first and a second reflecting element (5, 6). It further comprises means (4) for modifying the polarization state of a light beam after passing through said gain material for a first time and before passing through said gain material for a second time with respect to two orthogonal axes in a way which is equivalent to exchanging said two orthogonal axes. The polarization-rotating means (4) rotate the polarization of the light by 45° and are preferably a Faraday rotator. The reflecting element (5) is, e.g., a multilayer dielectric mirror. An incident light beam (1) is linearly polarized by the polarizing beamsplitter (2), amplified by the gain material (3), its polarization plane is rotated by the polarization rotator (4) by 45°, and the light beam is reflected by the reflecting element (5). It passes again through the polarization rotator (4) and the gain material (3). After this, the light is polarized perpendicularly with respect to the light before it passes the gain material (3). It is therefore reflected by the polarizing beamsplitter (2), and the emerging light beam (9) is consequently clearly separated from the incident light beam (1). This amplifier compensates thermally induced birefringence in the gain material (3).

15 Claims, 3 Drawing Sheets

MULTIPLE PASS OPTICAL AMPLIFIER WITH THERMAL BIREFRINGENCE COMPENSATION

FIELD OF THE INVENTION

The invention relates to a multiple pass optical amplifier and a method for amplifying electromagnetic radiation, particularly light, and especially laser light.

BACKGROUND OF THE INVENTION

There are an increasing number of applications for laser systems where the power of the laser beam must be maximized, and one attractive method for reaching high power levels is to amplify a laser beam generated in a separate laser by passing it through a laser gain material such as Nd:YAG or Nd:YVO$_4$. Many such amplifier systems have been demonstrated including straight forward single pass, and zig-zag designs. In order to maximize the energy extracted from a laser amplifier, of whatever design, multiple co-linear passes of the amplifier can be made. These multi-pass amplifier designs typically use polarization rotating devices to enable separation of the input and output laser beams. For example it is possible to obtain two passes of the amplifier using an optical polarizer and a quarter-wave plate, or using an optical isolator. To increase the efficiency of the amplifier further it is possible to obtain four co-linear passes of the gain material, for example, using an optical polarizer, a quarter-wave plate and an optical isolator, as proposed in U.S. Pat. No. 5,268,787 (McIntyre).

Although the multiple pass amplifier designs described above can in themselves increase the efficiency of optical amplifiers, this design in itself fails to address two important issues which can have a serious detrimental effect on amplifier performance.

One such issue is thermal depolarization which is significant in many solid state laser gain media. Thermal depolarization arises as a result of thermal stress due to absorption of pump or other energy. This induces stress-related birefringence in the gain material, which can cause rotation of the polarization of the amplified laser beam in the gain medium. Various techniques to compensate for thermal depolarization in laser resonators have been reported. In particular in W. A. Clarkson, N. S. Felgate, and D. C. Hanna, "Simple method for compensation of thermally-induced birefringence in high-power solid-state lasers", EuroCLEO 98, a quarter-wave plate, aligned to give zero phase retardation for the favored laser polarization, is inserted into the laser cavity. Further in C. A. Denman and S. I. Libby, "Birefringence Compensation using a Single Nd:YAG Rod", Advanced Solid State Lasers 1999, a 45-degree Faraday rotator is inserted into the laser cavity and used in combination with an optical polarizer. In both of these approaches the thermally induced birefringence of an initial pass is substantially cancelled in the next pass. In order to achieve this the amplified beam must experience birefringence distribution in the following pass that is, to the extent possible, the same as that in the initial pass. Usually this is done by making the beam re-trace the initial beam path. However, 4-pass amplifiers constructed in this way have the disadvantage that unwanted lasing might occur.

Apart from thermally induced birefringence another important issue, especially in the case of four-pass amplifiers, is the avoidance of unwanted lasing in the amplifier. This can occur when a stable optical cavity is formed by the mirrors in the amplifier system used to reflect the beam through its multiple passes of the gain medium. Lasing is particularly likely to occur in a 4-pass amplifier, when the thermally induced birefringence is large, and thus can rotate the polarization of the light on each pass through the gain medium to such a degree that light can be "trapped" in the amplifier rather than exiting through the polarizing beamsplitter after making a pass through the system. Thus thermal depolarization in the gain medium can be significant enough to allow lasing to occur where the presence of a polarizing beamsplitter and a polarization rotating device would otherwise prevent repeated passes along the same beam path.

SUMMARY OF THE INVENTION

It is an object of the invention to provide a multiple-pass optical amplifier and a method for amplifying light where thermal birefringence is compensated. It is a further object of the invention to provide a multiple-pass optical amplifier and a method for amplifying light where undesired lasing in the amplifier is avoided.

For studying the effect of thermal-stress-induced birefringence in a laser gain medium, the effect of the birefringence on a linearly polarized input beam can be considered. In passing through the birefringent gain medium (or any other birefringent component), the linearly polarized input beam is transformed into an elliptically polarized beam. Here we note that the direction of rotation of the polarization (i.e., left-handed or fight-handed) depends on the orientation of the fast and slow birefringent axes in the gain medium relative to the input polarization. Hence if the fast and slow birefringent axes are exchanged, then the direction of rotation is reversed. In order to compensate for the thermal-stress-induced birefringence, the elliptically polarized beam should be transformed back into one which is again linearly polarized. This could, at least in principle, be achieved by passing the beam through a device which exhibits a birefringence which is exactly equal and opposite to that of the gain medium. This means that at every point the two orthogonal birefringent axes are exchanged. However, the birefringence (or inverse birefringence) distribution in a typical laser rod is a function of position in the rod; it depends on the thermal load, the rod type etc. Therefore, it is not easily reproduced, and thus it is not generally possible to use such a separate device.

Instead of introducing a separate device in which the birefringent axes are exchanged compared to those in the gain medium, the invention exploits the birefringence distribution already present in the gain medium. This is done by modifying the polarization state of the elliptically polarized beam in a way (or ways) which is equivalent to exchanging the birefringent axes in the gain medium, and by passing the beam for a second time through the gain medium. In other words, the polarization state of the beam is modified so that it is the same as that which would have been obtained if the birefringent axes of the gain medium had been exchanged for the first pass.

According to the invention, the multiple pass optical amplifier for an incident light beam comprises:

an optical gain material;

means for reflecting a light beam which has passed once through said gain material back into said gain material;

means for modifying the polarization state of a light beam after passing through said gain material for a first time and before passing through said gain material for a second time with respect to two orthogonal axes in a way which is equivalent to exchanging said two orthogonal axes; and means for separating a light beam which has passed twice through said gain material from said incident light beam.

According to the invention, the method for amplifying an incident light beam comprises the steps of:

passing said incident light beam through an optical gain material;

reflecting the light beam which has passed once through said gain material back into said gain material;

modifying the polarization state of the light beam after passing through said gain material for a first time and before passing through said gain material for a second time with respect to two orthogonal axes in a way which is equivalent to exchanging said two orthogonal axes;

passing said incident light beam through said gain material for a second time; and separating the light beam which has passed twice through said gain material from said incident light beam.

A first exemplified embodiment of a 2-pass amplifier according to the invention rotates all polarization components of the elliptically polarized beam through 90°. This is equivalent to rotating the birefringent axes of the gain medium through 90°, which has the same effect as exchanging the two orthogonal axes of the gain medium. The 2-pass amplifier comprises a polarization rotator and a reflecting element which are both arranged behind the gain medium. The polarization rotator rotates the polarization plane of the light through 45° and is preferably a Faraday rotator. It rotates all polarization components of an optical beam in the same direction and by the same amount. The elliptically polarized beam passes two times through the polarization rotator, before and after its reflection. Therefore, it experiences a total polarization rotation of 90°. The polarization component of the elliptical beam which experienced one birefringent axis on the first pass of the gain medium will now experience the other on the second pass, and vice-versa.

A second exemplified embodiment of a 2-pass amplifier according to the invention reverses the direction of the rotation of the elliptical polarization of the beam and leaves the polarization otherwise unchanged. Thus the resulting polarization is the same as would be obtained if the two orthogonal birefringent axes in the gain medium had been exchanged for the first pass, and birefringence compensation will be achieved in the second pass of the laser rod. The 2-pass amplifier comprises a quarter-wave plate and a reflecting element which are both arranged behind the gain medium. The quarter-wave plate is oriented in such a way that it would not change the polarization of the linearly polarized beam if there was no birefringence in the gain medium. However, with thermally induced birefringence, light which passed once through the gain medium is generally elliptically polarized. Over two passes the quarter-wave plate generates a half-wave retardation and hence reverses the direction or the rotation of the elliptical polarization induced by thermal birefringence.

In the embodiment with the quarter-wave plate, complete birefringence compensation is only achieved for those components where the wave plate lies along the principle axis of the polarization ellipse. This will not be the case for all birefringence orientation in the gain medium. However, significant compensation of the total birefringence effects can still be achieved. For example in the case of a cylindrical laser rod in which, due to cylindrically symmetric thermal loading, the birefringent axes are basically radial and tangential, the quarter-wave plate can be aligned parallel to the input polarization. In this case, the effect of birefringence will be compensated at all points lying on lines at 0°, 45°, 90°, 135° (and 180°, 225°, 270°, 315°) from the input polarization and through the axis of symmetry. At these points, it can be shown that one axis or the polarization ellipse will be parallel to the input polarization. (In fact, at points lying on lines at 0°, 90°, 180° and 270° from the input polarization and through the axis of symmetry no birefringence compensation is required because the birefringent axes here are either parallel or perpendicular to the input polarization and so no depolarization occurs.).

It should be noted that the birefringence in the gain medium varies with the position in the gain medium. To achieve good polarization compensation, care must therefore be taken to ensure that any particular part of the beam being amplified experiences the same birefringence in the second pass as in the first pass. Ideally it should follow the same path (possibly in the opposite direction). In many cases, the birefringence in a gain medium exhibits symmetry, and this may be exploited when trying to fulfill the above requirement; possibly the exactly same path need not be followed.

In the four pass configuration the thermal birefringence experienced in the third pass is compensated for by that of the fourth pass, in the same way as that of the first pass is compensated in the second.

In order to prevent unwanted lasing in an amplifier it is possible to design the system so that no stable optical cavity is formed. In this case there is no possible laser mode which would reproduce itself with each passage through the potential laser cavity. However in general this means that the laser beam being amplified also fails to follow the same path through the gain medium in consecutive passes, and therefore that the thermal depolarization measures described above become ineffective or less effective. It turns out that in general all amplifier designs in which the optical path of the amplified beam exactly retraces that of the previous path a stable optical cavity tends to be formed (or one which is very close to stability) and unwanted lasing can occur.

Unwanted lasing in the amplifier can be avoided by making the beam follow a non-reciprocal but symmetrical beam path through the amplifier. In this case it is possible to design the optical system so that no stable optical cavity is formed. At the same time, for the case of an amplifier which exhibits symmetry about a plane the normal of which is parallel to the optical axis, the thermally induced birefringence in the gain medium can remain fully or almost fully compensated for as the thermally induced birefringence distribution exhibits the same symmetry.

According to the invention, a further embodiment of a multiple pass optical amplifier for an incident light beam comprises:

an optical gain material;

first means for reflecting a light beam which has passed through said gain material back into said gain material;

first means for separating a light beam which has twice passed through said gain material from said incident light beam;

second means for reflecting a light beam which has twice passed through said gain material back into said gain material;

second means for separating a light beam which has four times passed through said gain material from said incident light beam;

whereby all components of the amplifier are designed and mutually arranged in such a way that upon passing said gain material for a second time, the path of the light beam is non-reciprocal but symmetrical about a center plane of said gain material, the normal of which is parallel to the optical axis, with respect to the path of a light beam passing through said gain material for a first time, and upon passing said gain material for a fourth time, the path of the light beam is non-reciprocal but symmetrical about a center plane of said gain material, the normal of which is parallel to the optical axis, with respect to the path of a light beam passing through said gain material for a third time.

According to the invention, a further embodiment of the method for amplifying an incident light beam comprises the steps of:

passing said incident light beam through an optical gain material;

reflecting the light beam which has passed through said gain material back into said gain material;

passing the light beam through said optical gain material for a second time, whereby the path of the light beam is non-reciprocal but symmetrical about a center plane of said gain material, the normal of which is parallel to the optical axis, with respect to the path of the light beam passing through said gain material for a first time, and separating the light beam which has twice passed through said gain material from said incident light beam;

reflecting the light beam which has twice passed through said gain material back into said gain material;

passing the light beam through said optical gain material for a third time;

reflecting the light beam which has passed through said gain material back into said gain material;

passing the light beam through said optical gain material for a fourth time, whereby the path of the light beam is non-reciprocal but symmetrical about a center plane of said gain material, the normal of which is parallel to the optical axis, with respect to the path of a light beam passing through said gain material for a third time; and separating the light beam which has four times passed through said gain material from said incident light beam.

BRIEF DESCRIPTION OF THE DRAWINGS

The accompanying drawings schematically illustrate various embodiments of the invention.

DESCRIPTION OF THE PREFERRED EMBODIMENTS

Figure 1:
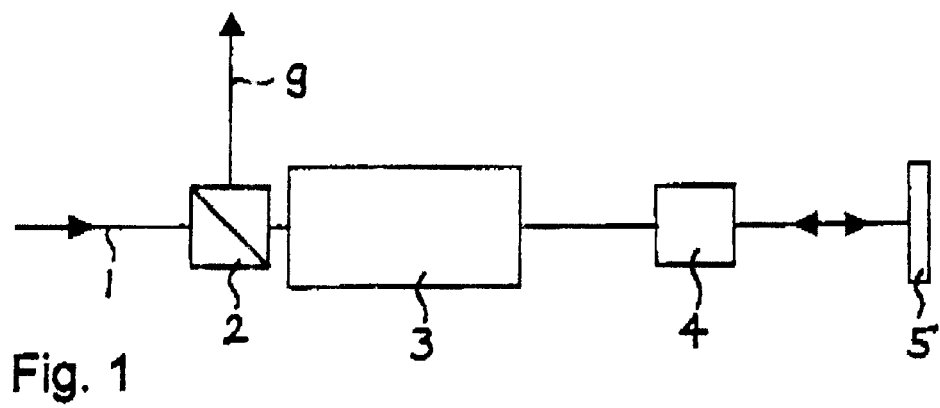
FIG. 1 shows a thermal-birefringence-compensated 2-pass amplifier using a Faraday rotator.

FIG. 1 shows a first embodiment of a 2-pass amplifier according to the invention. It comprises a polarizing beamsplitter 2, a gain material 3, a polarization rotator 4 and a reflecting element 5. The gain material 3 may consist of, e.g., Nd:YAG, Nd:YVO$_4$, Nd:YLF or Ti:sapphire. In order to amplify light, it must be excited by a pumping mechanism (not shown); for this purpose, it can be, e.g., side pumped with laser diodes. The polarization rotator 4 rotates the polarization of the light by 90° over two passes and is preferably a Faraday rotator. The reflecting element 5 is, e.g., a multilayer dielectric mirror. An incident light beam 1 is linearly polarized by the polarizing beamsplitter 2, amplified by the gain material 3, its polarization plane is rotated by the polarization rotator 4 by 45°, and the light beam is reflected by the reflecting element 5. It passes again through the polarization rotator 4 and the gain material 3. After this, the light is polarized perpendicularly with respect to the light before it passes the gain material 3. It is therefore reflected by the polarizing beamsplitter 2, and the emerging light beam 9 is consequently clearly separated from the incident light beam 1. This amplifier compensates thermally induced birefringence in the gain material 4.

Figure 2:
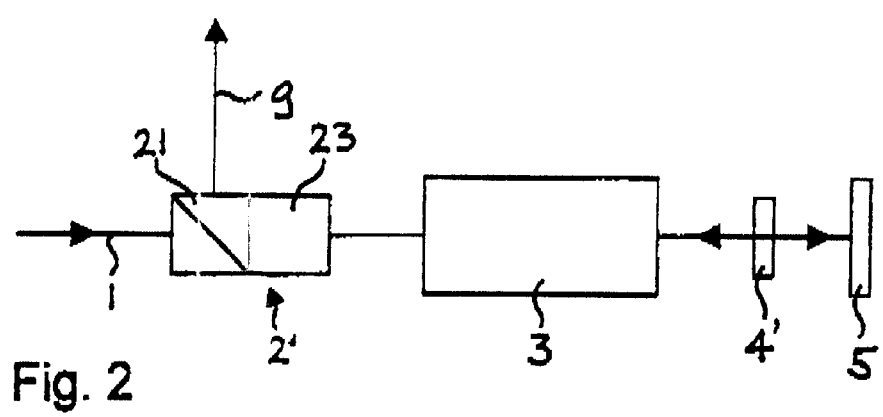
FIG. 2 shows a thermal-birefringence-compensated 2-pass amplifier using a quarter-wave plate.

FIG. 2 shows a second embodiment of a 2-pass amplifier according to the invention. This embodiment is especially suited for designs with a polarizationdependent gain material 3, because the light polarization is essentially the same for both passes. The amplifier comprises an optical isolator 2', a gain material 3, a quarter-wave retardation plate 4' and a reflecting element 5. The optical isolator 2' may comprise a polarizing beamsplitter 21 and a 45°-oriented Faraday rotator 23, and it preferably comprises two polarizers at 45° to each other with a 45°-oriented Faraday rotator in-between; it also may comprise a half-wave retardation plate (not shown) for controlling the polarization direction. An incident light beam 1 is linearly polarized by the polarizer 21, and its direction of polarization is rotated through 45° by the Faraday rotator 23. The quarter-wave plate 4' is oriented such that the linearly polarized beam which emerges from the Faraday rotator 23 would pass through it without experiencing any phase retardation. However, due to thermally induced birefringence, light which passed once through the gain material 3 is generally elliptically polarized. Upon two passes through the quarter-wave plate 4', the rotation direction of the elliptical polarization is reversed, and the thermally induced birefringence in the gain material 3 is compensated. After two passes through the gain material 3, the Faraday rotator 23 again rotates the polarization direction of the light through 45°, such that the emerging light beam 9 is polarized perpendicularly to the incident light beam 1.

Figure 3:
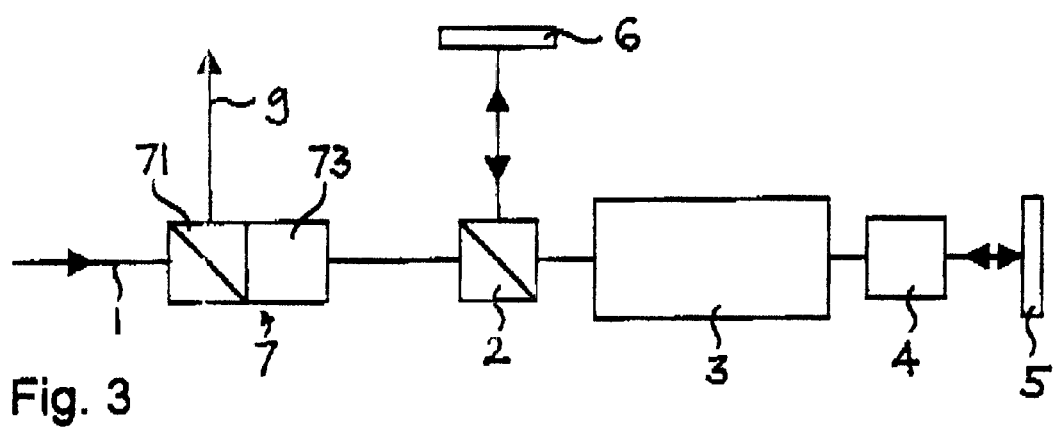
FIG. 3 shows a thermal-birefringence-compensated 4-pass amplifier using a Faraday rotator.

FIG. 3 shows a 4-pass amplifier according to the invention. It essentially comprises the 2-pass amplifier of FIG. 1 combined with an optical isolator 7. The optical isolator 7 may comprise a polarizing beamsplitter 71 and a Faraday rotator 73. The output of the 2-pass amplifier is provided with a second reflecting element 6 which, after two passages through the gain material 3, reflects light back to the 2-pass amplifier. After a third and a fourth passage through the gain material 3, the light beam exits the 2-pass amplifier essentially on the same path as it came in, and is reflected by the optical isolator 7.

Figure 4:
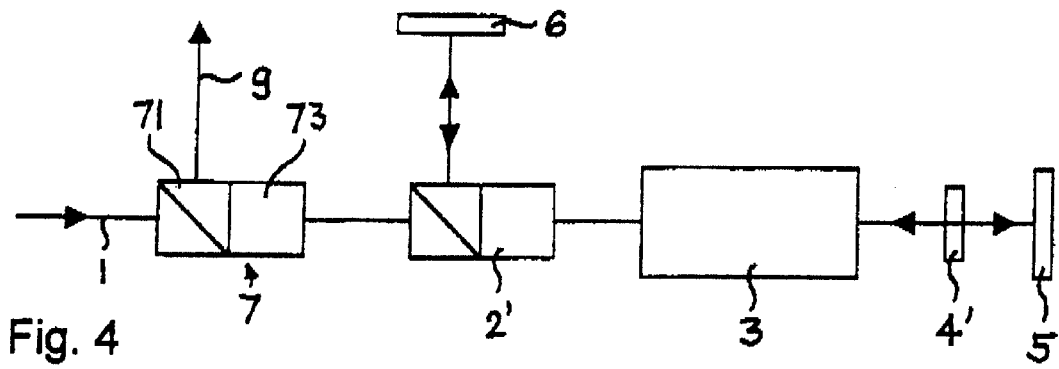
FIG. 4 shows a thermal-birefringence-compensated 4-pass amplifier using a quarter-wave plate.

FIG. 4 shows another embodiment of a 4-pass amplifier according to the invention. It essentially comprises the 2-pass amplifier of FIG. 2 combined with an optical isolator 7.

Figure 5:
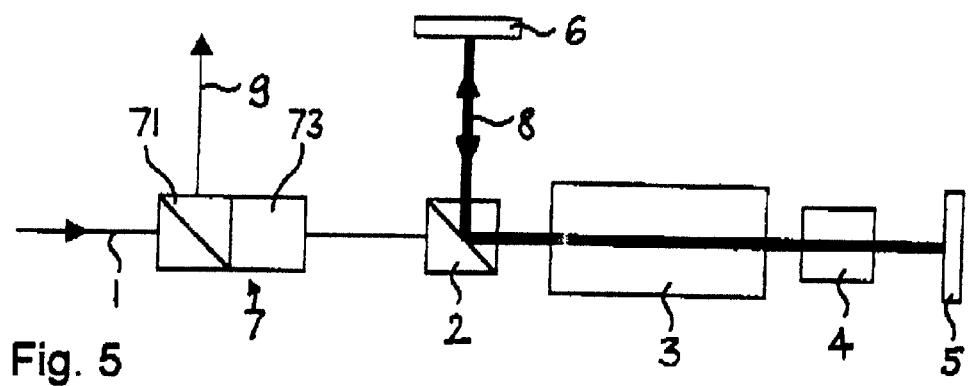
FIG. 5 shows the 4-pass amplifier of FIG. 3 with a possible beam path for undesired lasing.

An example path over which an undesired stable optical cavity may form in the presence of thermal depolarization is shown in FIG. 5. The 4-pass amplifier of FIG. 5 is identical to that of FIG. 3. A stable laser cavity or resonator, indicated by a thick line 8, may be formed by the two reflecting elements 5, 6 and the gain medium 3.

Figure 6:
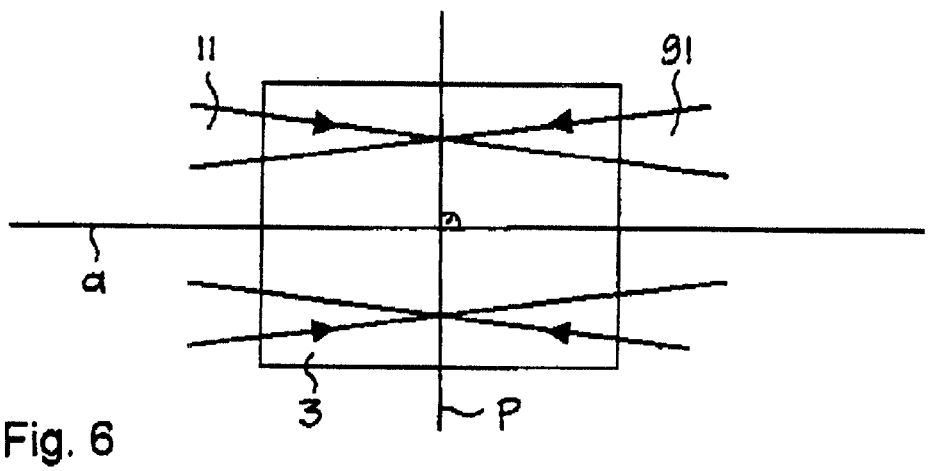
FIG. 6 illustrates the inventive measure for avoiding undesired lasing.

According to the invention, unwanted lasing can be prevented by designing the optical system so that no stable optical cavity is formed, but, simultaneously, thermally induced birefringence is compensated. For this purpose, light beams 11 passing for the first (third, fifth, . . . ) time through the gain medium 3 and light beams 91 passing for the second (fourth, sixth, . . . ) time through the gain medium 3 must exhibit symmetry about a plane P the normal of which is parallel to the optical axis a. FIG. 6 shows an example of such ray paths in the gain material 3.

Figure 7:
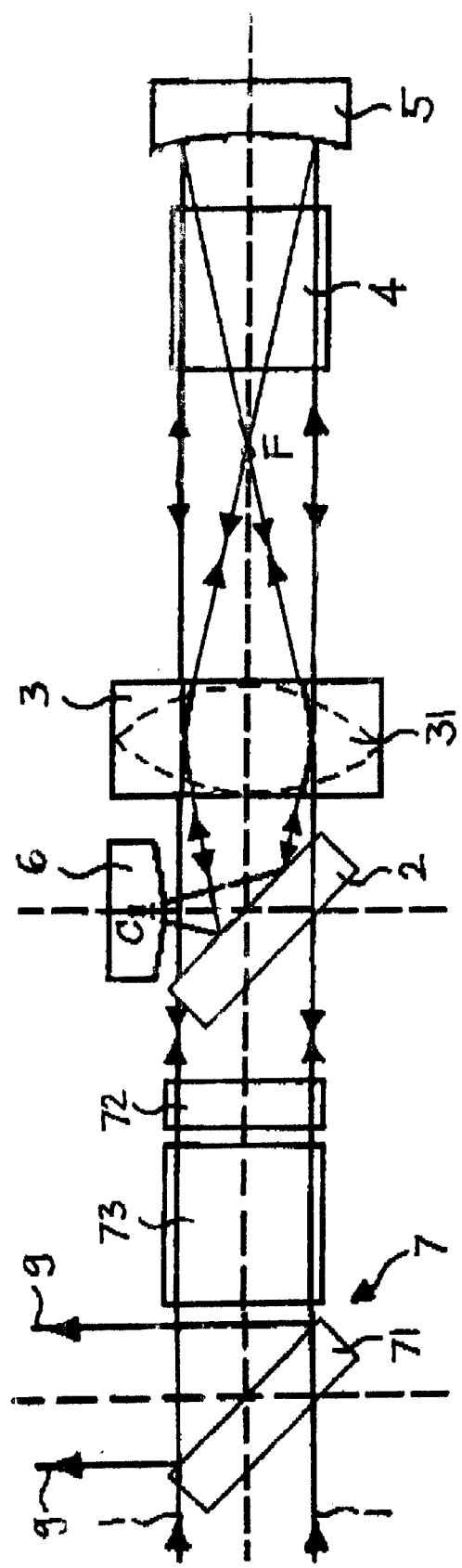
FIG. 7 shows an example of a complete amplifier according to the invention.

There are many possible designs of such a 4-pass amplifier where no stable optical cavity is formed and the amplified beam paths in the gain medium remain symmetric. An example which essentially corresponds to the 4-pass amplifier of FIG. 3 is shown in FIG. 7. In this design, a thermal lens 31, indicated by dashed lines, is assumed in the gain material 3. The first reflecting element 5 is a concave spherical mirror which forms a confocal system with the thermal lens 31, i.e., the foci of the thermal lens 31 and of the concave mirror 5 coincide in one single point F. In the preferred embodiment of FIG. 7, the focal lengths of the thermal lens 31 and of the concave mirror 5 are the same. Amplifier designs which do not fulfill the latter condition are also possible and fall within the scope of the present invention. The second reflecting element 6 is a convex spherical mirror. The center of curvature C of the convex mirror 6 coincides with the second focus of the thermal lens 31, so that the light beam is retroreflected towards the gain material 3 on the same path as the light beam propagating towards the convex mirror 6. Amplifier designs which do not fulfill the latter condition are also possible and fall within the scope of the present invention. The optical isolator 7 preferably comprises two polarizers 71, 72 at 45° to each other with a 45°-oriented Faraday rotator 73 in-between, and a polarizing beamsplitter which can be identical to the first polarizer 71. An amplifier of the above design can (but not necessarily will) fulfill the condition that no stable laser cavity is formed, depending on the values of the thermal lens and the mirror radii of curvature. ABCD matrix analysis can be used to test whether a particular optical design will produce a stable laser cavity or not.

Numerous other embodiment may be envisaged, without departing from the spirit and scope of the invention.

What is claimed is:

1. A multiple pass optical amplifier for an incident light beam, comprising:
   an optical gain material;
   first means for reflecting a light beam which has passed through said gain material back into said gain material;
   first means for separating a light beam which has passed twice through said gain material from said incident light beam;
   second means for reflecting a light beam which has passed twice through said gain material back into said gain material;
   second means for separating a light beam which has passed four times through said gain material from said incident light beam;
   whereby all components of the amplifier are designed and mutually arranged in such a way that
      upon passing said gain material for a second time, the path of the light beam is non-reciprocal but symmetrical about a center plane of said gain material, the normal of which is parallel to the optical axis, with respect to the path of a light beam passing through said gain material for a first time, and
      upon passing said gain material for a fourth time, the path of the light beam is non-reciprocal but symmetrical about a center plane of said gain material, the normal of which is parallel to the optical axis, with respect to the path of a light beam passing through said gain material for a third time.

2. The amplifier of claim 1, wherein said first reflecting means is a concave mirror and said second reflecting means is a convex mirror.

3. The amplifier according to claim 1, wherein said first separating means comprises a polarizer, a polarizing beamsplitter or an optical isolator.

4. The amplifier according to claim 1, wherein said second separating means comprises an optical isolator.

5. The amplifier according to claim 1, further comprising means for modifying the polarization state of a light beam after passing through said gain material for a first time and before passing through said gain material for a second time with respect to two orthogonal axes in a way which is equivalent to exchanging said two orthogonal axes.

6. The amplifier according to claim 5, wherein said polarization-modifying means comprises means for non-reciprocally rotating the polarization of a light beam, placed between said gain material and said reflecting means.

7. The amplifier according to claim 6, wherein said polarization-rotating means comprises a Faraday rotator.

8. The amplifier according to claim 7, wherein said Faraday rotator rotates the polarization vector of the light beam through + or −45°.

9. The amplifier according to claim 5, wherein said polarization-modifying means comprises a retardation plate placed between said gain material and said reflecting means.

10. The amplifier according to claim 9, wherein said retardation plate is a quarter-wave plate.

11. A method for amplifying an incident light beam, comprising the steps of:
    passing said incident light beam through an optical gain material;
    reflecting the light beam which has passed through said gain material back into said gain material;
    passing the light beam through said optical gain material for a second time, whereby the path of the light beam is non-reciprocal but symmetrical about a center plane of said gain material, the normal of which is parallel to the optical axis, with respect to the path of the light beam passing through said gain material for a first time, and
    separating the light beam which has twice passed through said gain material from said incident light beam;
    reflecting the light beam which has twice passed through said gain material back into said gain material;
    passing the light beam through said optical gain material for a third time;
    reflecting the light beam which has passed through said gain material back into said gain material;
    passing the light beam through said optical gain material for a fourth time, whereby the path of the light beam is non-reciprocal but symmetrical about a center plane of said gain material, the normal of which is parallel to the optical axis, with respect to the path of a light beam passing through said gain material for a third time; and
    separating the light beam which has passed four times through said gain material from said incident light beam.

12. The method according to claim 11, further comprising the step of modifying the polarization state of the light beam after passing through said gain material for a first time and before passing through said gain material for a second time with respect to two orthogonal axes in a way which is equivalent to exchanging said two orthogonal axes.

13. The method according to claim 12, wherein the polarization vector of the light beam is non-reciprocally rotated after passing through said gain material for a first time and before passing through said gain material for a second time.

14. The method according to claim 13, wherein the polarization of the light beam is rotated through + or −45°.

15. The method according to claim 12, wherein a first light beam component polarized parallel to a first orthogonal axis is retarded by 180° with respect to a second light beam component polarized parallel to a second orthogonal axis after passing through said gain material for a first time and before passing through said gain material for a second time.

* * * * *